United States Patent [19]

Lazzari et al.

[11] Patent Number: 5,764,448
[45] Date of Patent: Jun. 9, 1998

[54] MAGNETIC READ HEAD HAVING A MULTILAYER MAGNETORESISTANT ELEMENT AND A CONCENTRATOR, AS WELL AS ITS PRODUCTION PROCESS

[75] Inventors: Jean-Pierre Lazzari, Corenc; Jean Mouchot, Grenoble, both of France

[73] Assignees: Commissariat A L'Energie Atomique, Paris; Silmag, Grenoble Cedex, both of France

[21] Appl. No.: 810,378

[22] Filed: Mar. 3, 1997

Related U.S. Application Data

[63] Continuation of Ser. No. 565,015, Nov. 30, 1995, abandoned, which is a continuation of Ser. No. 330,674, Oct. 28, 1994, abandoned.

[30] Foreign Application Priority Data

Nov. 8, 1993 [FR] France ................................ 93 13249

[51] Int. Cl.$^6$ ................................ G11B 5/127; G11B 5/33
[52] U.S. Cl. ................................ 360/113
[58] Field of Search ................ 360/113; 324/252; 338/32 R

[56] References Cited

U.S. PATENT DOCUMENTS

| | | | |
|---|---|---|---|
| 4,356,523 | 10/1982 | Yeh | 360/113 |
| 5,134,533 | 7/1992 | Friedrich et al. | 360/113 |
| 5,193,039 | 3/1993 | Smith et al. | 360/113 |
| 5,235,169 | 8/1993 | Wakaumi et al. | 235/472 |
| 5,274,520 | 12/1993 | Matsuzono et al. | 360/113 |
| 5,274,521 | 12/1993 | Miyauchi et al. | 360/119 |
| 5,504,643 | 4/1996 | Lazzari | 360/113 |

FOREIGN PATENT DOCUMENTS

| | | | |
|---|---|---|---|
| 0 221 540 | 5/1987 | European Pat. Off. | |
| 0 472 187 | 2/1992 | European Pat. Off. | |
| 0 560 350 | 9/1993 | European Pat. Off. | |
| 62-134814 | 6/1987 | Japan | |
| 0512626 | 1/1993 | Japan | 360/113 |
| 2143071 | 1/1985 | United Kingdom | 360/113 |
| WO 93/08562 | 4/1993 | WIPO | |

OTHER PUBLICATIONS

Patent Abstracts of Japan, vol. 14, No. 353 (P-1086) (4296), Jul. 31, 1990, JP-A-02 128313, May 16, 1990.
Patent Abstracts of Japan, vol. 6, No. 22 (P-101) (900), Feb. 9, 1982, JP-A-56 143514, Nov. 9, 1981.

*Primary Examiner*—Robert S. Tupper
*Assistant Examiner*—William J. Kimowicz
*Attorney, Agent, or Firm*—Oblon, Spivak, McClelland, Maier & Neustadt, P.C.

[57] ABSTRACT

A magnetic read head having a multilayer magnetoresistant element and a concentrator, and a method of production the magnetic read head. The magnetic head includes a multilayer magnetoresistant element across a head gap of the concentrator positioned to the rear of pole pieces defining the gap of the head. Such a magnetic head may find particular application to magnetic recording.

13 Claims, 5 Drawing Sheets

MAGNETIC READ HEAD HAVING A MULTILAYER MAGNETORESISTANT ELEMENT AND A CONCENTRATOR, AS WELL AS ITS PRODUCTION PROCESS

This application is a continuation of a application Ser. No. 08/565,015, filed on Nov. 30, 1995, now abandoned, which is a continuation of Ser. No. 08/330,674, filed Oct. 28, 1994, also abandoned.

DESCRIPTION

1. Technical Field

The present invention relates to a magnetic read head having a multilayer magnetoresistant element and a concentrator, as well as to its production process. It is used in magnetic information recording.

2. Prior art

Magnetic read heads with a magnetoresistant element are known. For some of them the magnetoresistant element is placed beneath the head gap and this is e.g. described in FRA-A-2 645 314 and FR-A-2 657 189. In others, the magnetoresistant element is placed to the rear of the magnetic circuit and is used for closing the latter, as is e.g. described in EP-A-472 187 and EP-A-475 397.

The heads using a magnetoresistant element closing the magnetic circuit to the rear of the head operate with monolithic magnetic materials. They are mainly compounds based on iron and nickel, or compounds based on iron, nickel and cobalt. However, with such materials if the magnetoresistant element is used in the longitudinal position, the sensitivity is low, because the magnetic reading field is parallel to the detection current flowing in the element. This sensitivity can be improved by making the element operate transversely, i.e. by turning it by 90° so that the magnetic reading field traverses the element in its width direction, the detection current still being applied in the length direction. However, this arrangement leads to construction problems.

The present invention aims at obviating these disadvantages.

DESCRIPTION OF THE INVENTION

To this end, the invention firstly recommends the use, for the formation of the magnetoresistant element, of a multilayer instead of monolithic material. It is a question of materials constituted by a stack of magnetic layers separated by non-magnetic metal layers.

The multilayer magnetic structures use cobalt, iron, copper, chromium, nickel, iron and nickel alloys, silver, gold, molybdenum, ruthenium and manganese are described in the article by H. YAMAMOTO and T. SHINJO, published in "IEEE Translation Journal on Magnetics in Japan", vol.7, no.9, Sep. 1992 with the title "Magnetoresistance of Multilayers", pp.674–684.

Multilayer materials have interesting properties such as a considerable magnetoresistive effect, low saturation field, low coercivity and good annealing behavior. The best structures obtained up to now have been formed by FeNi layers separated by copper layers, as described in the article by S.S.P. PARKIN entitled "Oscillations in Giant Magnetoresistance and Antiferromagnetic Coupling in [Ni$_8$ $_1$ Fe$_1$ 9/Cu]$_N$ N Multilayers", published in "Appl. Phys. Lett." 60, no.4, Jan. 1992, pp.512–514 and the article by R. NAKATANI et al published in "IEEE Transactions on Magnetics", vol.28, no.5, Sep. 1992, pp.2668–2670 and entitled "Giant Magnetoresistance in Ni-Fe/Cu Multilayers Formed by Ion Beam Sputtering".

Good results are also obtained with structures formed from FeNi films separated by silver coatings, as described in the article by B. RODMACQ et al published in "Journal of Magnetism and Magnetic Materials", 118, 1993, pp.L11–L16 and entitled "Magnetoresistive Properties and Thermal Stability of Ni-Fe/Ag Multilayers".

These new materials have the property of being highly magnetoresistive, i.e. have a relative resistivity variation ratio from 10 to 20% and low saturation magnetic fields below 40kA/m.

With materials of the multilayer type, there is a high sensitivity to the flux or flow when the magnetic field is applied in the longitudinal direction. For a constant magnetoresistance coefficient, the sensitivity is at a maximum when the saturation field is weak. The saturation field corresponds to the magnetic field which it is necessary to apply in order to orient, in the same direction and the same sense, the magnetization of each of the different magnetic layers.

In a field parallel to the length of a bar of a multilayer material, said field is equal to the coupling field of the unitary layers. In the transverse field, the appearance of demagnetizing fields increases the saturation field, which reduces sensitivity.

In other words, it is preferable from the sensitivity standpoint, to place the magnetoresistant element in a longitudinal position, i.e. with its largest dimension parallel to the magnetic field to be read.

Besides this first feature of the invention, linked with the use of multilayer materials in the longitudinal position, the invention recommends a second feature, which is that of using a magnetic field concentrator formed from two magnetic layers defining a second head gap across which there is the magnetoresistant element. In this way, there is a concentration of the magnetic reading field in the magnetoresistant element, which increases the measuring signal.

More specifically, the present invention relates to a magnetic reading head comprising a magnetic circuit having two pole pieces separated by a first head gap and a longitudinal magnetoresistant element, said head being characterized in that it also comprises two magnetic layers in contact with the pole pieces and spaced from one another by a second head gap located beneath the first, said magnetic layers having a width which decreases on approaching the second head gap and thus forming a magnetic field concentrator, the longitudinal magnetoresistant element being placed across said second head gap and being made from a multilayer material constituted by a stack of magnetic layers separated by non-magnetic metal layers.

In an advantageous embodiment, the magnetoresistant element is formed from several parallel longitudinal portions arranged juxtaposed across the second head gap, said portions being electrically connected in series by their ends by transverse portions.

The read head can also comprise an electrical conductor able to longitudinally polarize the magnetoresistant element.

The read head according to the invention can easily be completed by means able to permit its operation in writing. These means consist of a lower pole piece and a conductor coil.

The present invention also relates to a process for the production of the head as defined hereinbefore.

DETAILED DESCRIPTION OF AN EMBODIMENT

Figure 1:
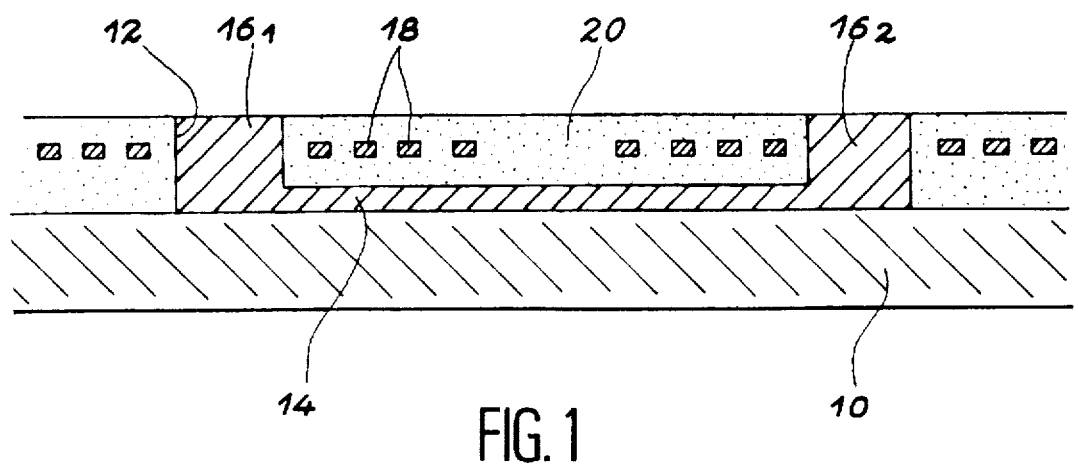
FIG. 1 shows a subassembly relative to writing means.

The features of the read head according to the invention will become apparent through the successive stages of its production process.

If it is only wished to obtain a read head, use will initially be made of a substrate, e.g. constituted by a silicon wafer. If it is wished to obtain a read head also able to operate in the writing mode, the subassembly as illustrated in FIG. 1 will initially be used.

This subassembly is obtained by operations known to the expert and which are e.g. described in FR-A-2 645 314 (or its corresponding US-A-5 208 716) and will not be described in detail here. It is merely necessary to point out that on an e.g. silicon semiconductor substrate 10 is formed a recess 12, in which is deposited a lower magnetic layer 14 and two magnetic pillars ($16_1$, $16_2$).

A conductor coil 18 is then wound around the pillars $16_1$, $16_2$, whereby said coil can be made from copper. Only a few turns are illustrated in FIG. 1, but it is clear that in practice there can e.g. be 16 turns in the same plane, distributed in the form of twice 8 turns. This coil will be buried in an insulating layer 20.

Figure 2:
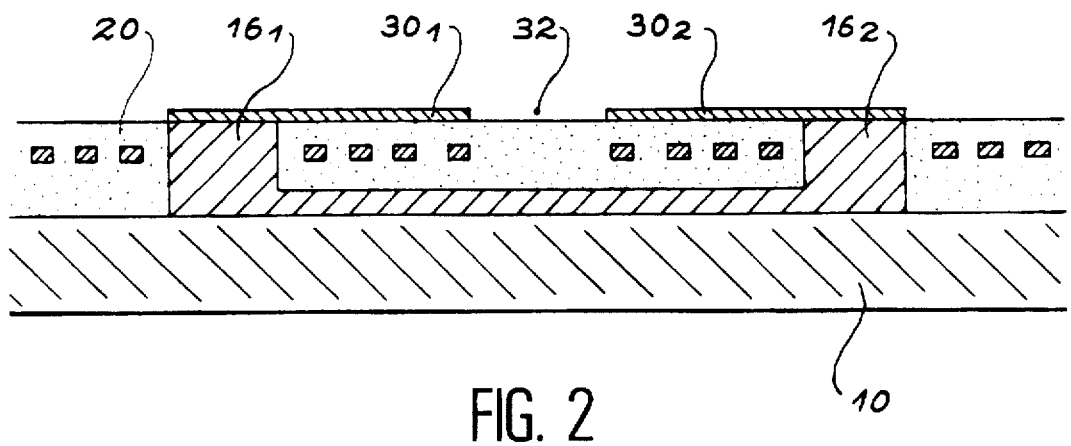
FIG. 2 shows in section the construction of a concentrator.
Figure 3:
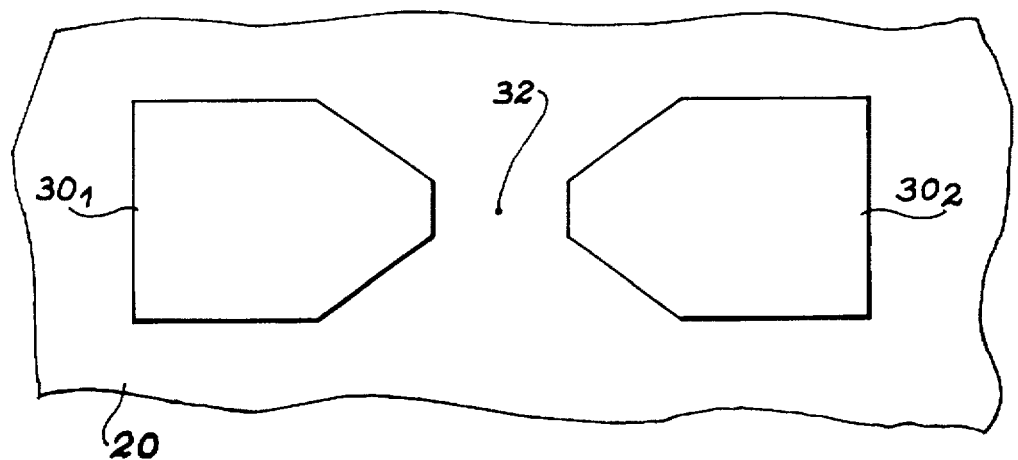
FIG. 3 shows the concentrator in plan view.

The operations necessary for producing the reading part then commence from the subassembly of FIG. 1 taken as the substrate. Firstly deposition takes place of a magnetic material layer and the latter is etched in order to form the two pieces $30_1$, $30_2$, which are spaced from one another by a head gap 32 (FIGS. 2 and 3). The width of these layers decreases on approaching the head gap 32.

Figure 4:
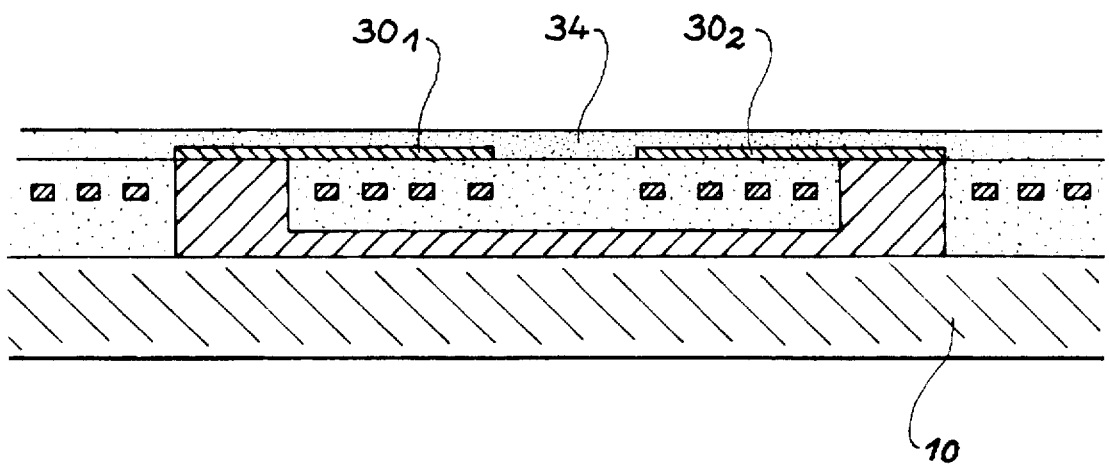
FIG. 4 illustrates an intermediate stage of depositing an insulating layer.

FIG. 3 shows layers $30_1$, $30_2$, which have a trapezoidal shape, but any other shape is possible provided that the magnetic flux concentration function is fulfilled. The material used for producing said concentrator can be iron nickel. On the assembly is then deposited a first, e.g. silica insulating layer 34 with a thickness of 0.1 to 0.5 μm (FIG. 4).

Figure 5:
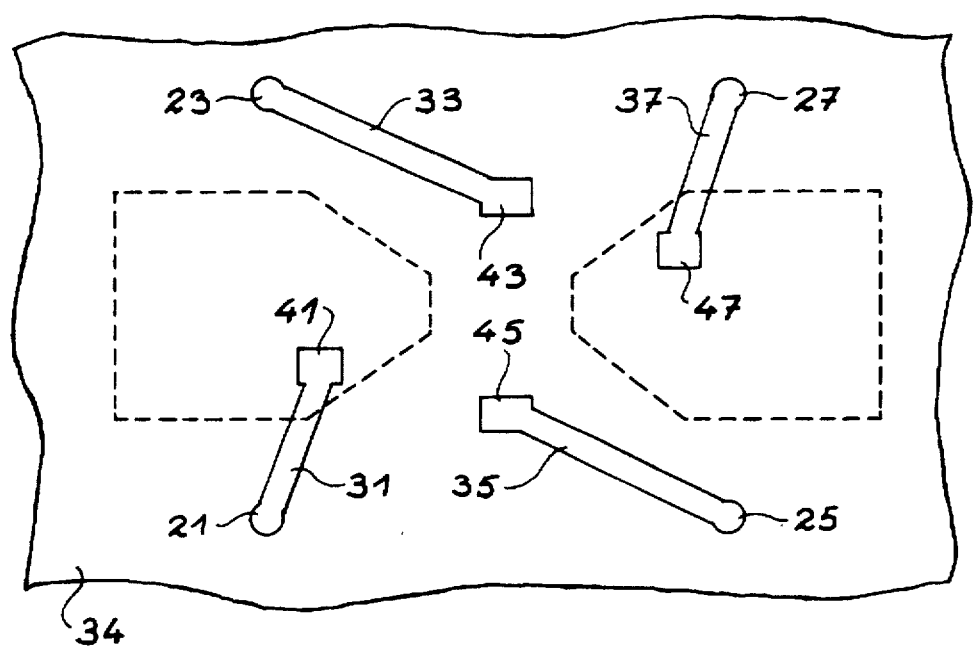
FIG. 5 shows in plan view connection elements.

This is followed by the deposition of a conductive material layer, which is preferably of a refractory material such as titanium, tungsten or molybdenum. The thickness of this layer can be between 0.05 and 0.5 μm. On said metal layer photolithography is then performed, so as to form the external elements 21, 23, 25, 27, the internal elements 41, 43, 45, 47 and conductive strips 31, 33, 35, 37 linking the internal elements with the external elements (FIG. 5).

Figure 6:
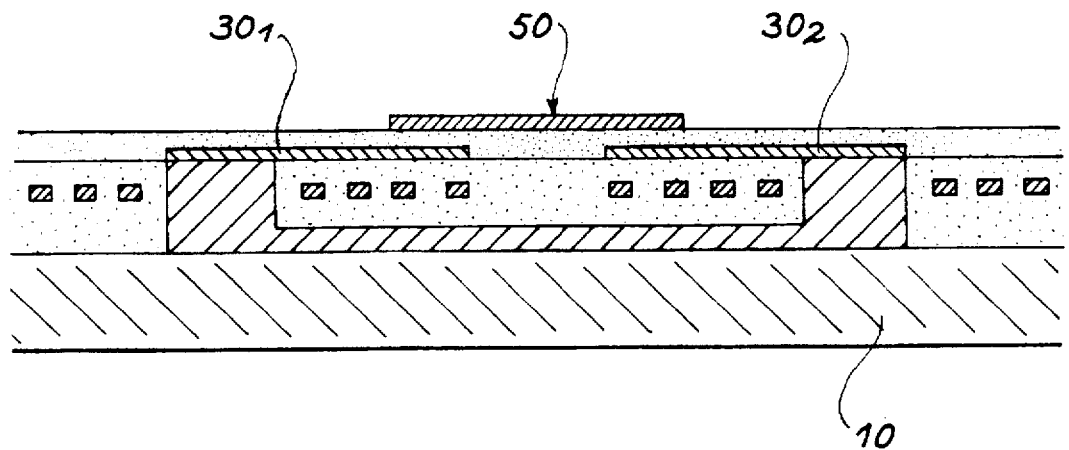
FIG. 6 shows in section a magnetoresistant element.

This is followed by the production of the magnetoresistant element. For this purpose, a multilayer magnetoresistant material layer is deposited and is etched in order to form a magnetoresistant element 50 (FIG. 6). The multilayer magnetoresistant material can e.g. be Ag/FeNi.

Figure 7:
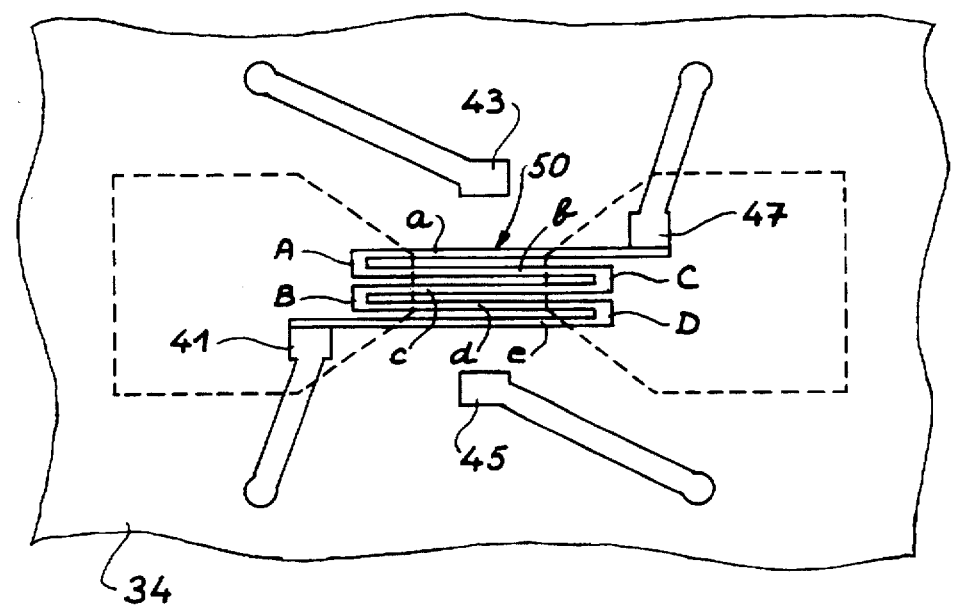
FIG. 7 shows a magnetoresistant element in plan view.

In the embodiment illustrated in FIG. 7, the magnetoresistant element 50 has parallel longitudinal portions (a, b, c, d, e) arranged in a juxtaposed manner across the head gap 32 and transverse portions (A, B, C, D) linking the ends of the longitudinal portions. The magnetoresistant element is connected to the elements 41 and 47.

The longitudinal portions project from each side of the head gap 32 and overlap the two pieces of the concentrator by approximately 2 μm. For example, if the head gap 32 has a length of 4 μm, the length of the longitudinal strips will be approximately 8 μm.

Figure 8:
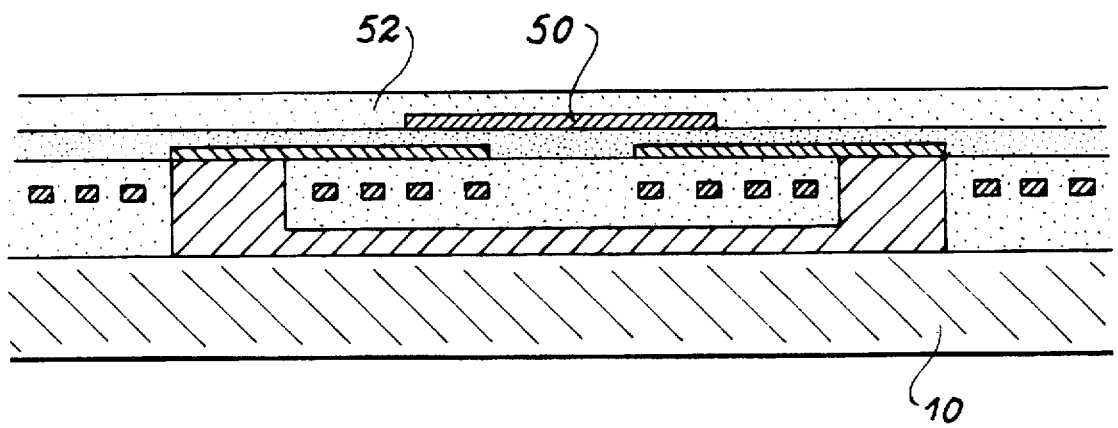
FIG. 8 illustrates an intermediate stage of depositing a new insulating layer.
Figure 9:
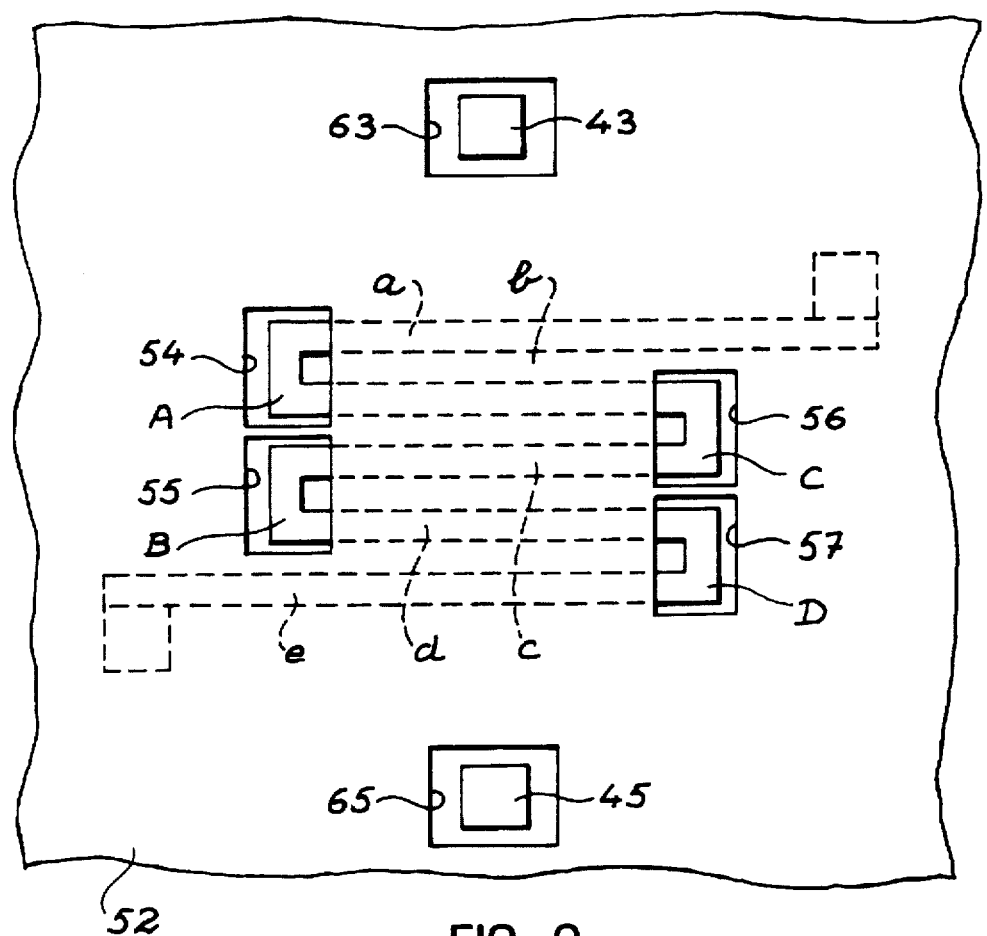
FIG. 9 shows the formation of openings in the insulating layer.
Figure 10:
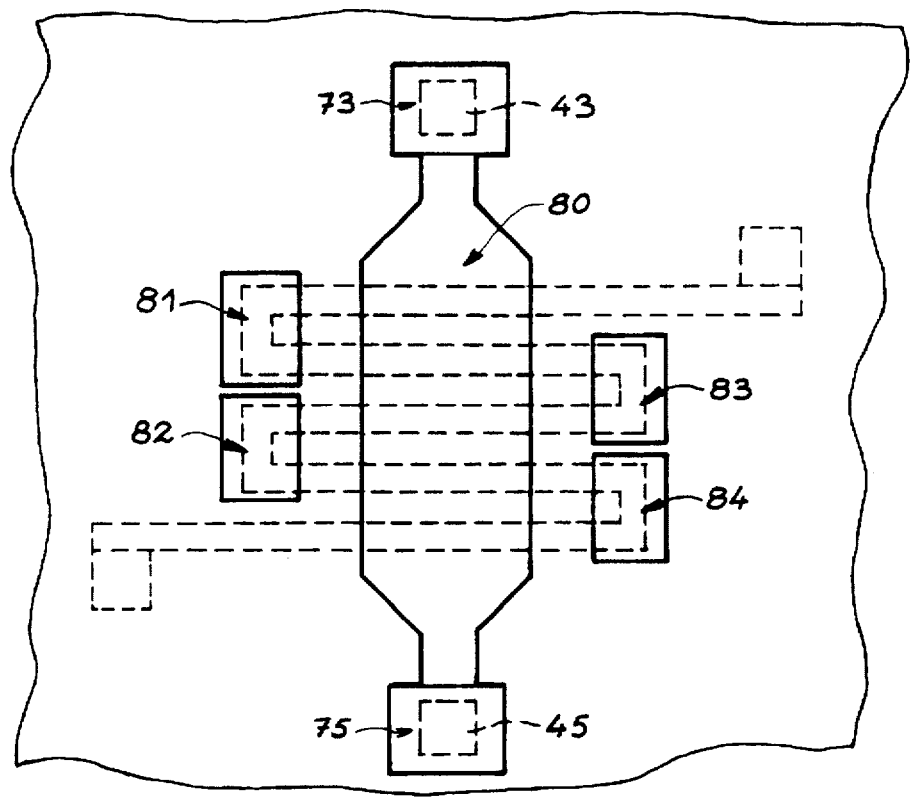
FIG. 10 shows the conductor elements and a conductive polarizing element.

On the assembly is then deposited a further insulating layer 52, e.g. of silica (FIG. 8). By photolithography, two openings 63, 65 are formed in order to free the elements 43, 45, which will be used for connecting the polarization conductor. In this operation, it is also possible to free the ends A, B, C and D of the magnetoresistant element through openings 54, 55, 56, 57 (FIG. 9).

This is followed by the deposition of a further metal layer, e.g. of the same type as the previous one and with a relatively limited thickness of e.g. 0.5 μm, followed by a conductive layer, e.g. of copper.. By photolithography, two elements 73, 75 are left in the openings 63, 65, which have been freed and between said two ends is produced a ribbon 80, which will serve as the polarization conductor. Simultaneously, the elements 81, 82, 83, 84 are left in the openings 54, 55, 56, 57 made at the ends of the magnetoresistant element. These elements short-circuit the ransverse arms A, B, C, D of the magnetoresistant element. In this way, only the longitudinal arms a, b, c, d and e are active.

Figure 11:
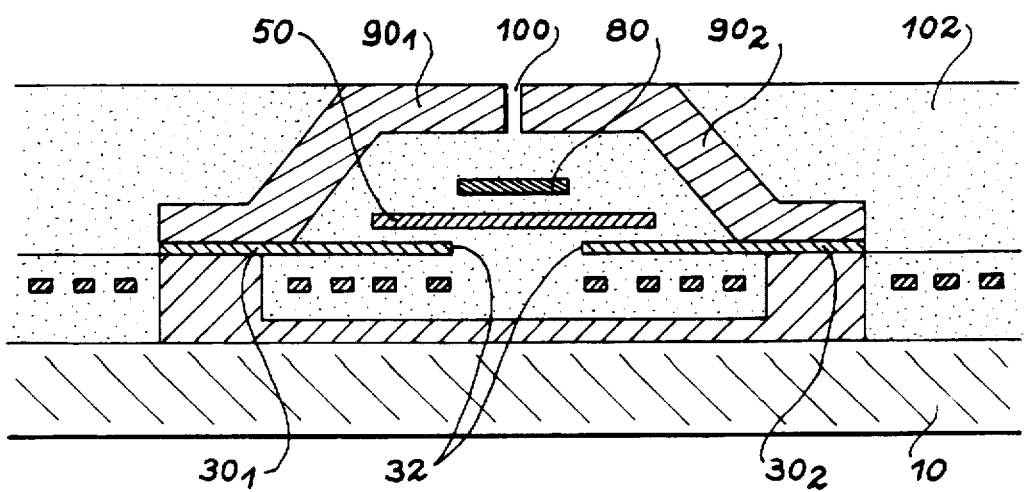
FIG. 11 shows the read - write head finally obtained.

The production of the head is completed (FIG. 11) by producing two pole pieces $90_1$, $90_2$ separated by a head gap 100, everything being embedded in an insulant 102.

The connection elements of the magnetoresistant element and the polarization conductor are displaced towards the periphery of the device 21, 23, 25, 27, so that there is no problem in establishing intraconnections across the insulating layer 102.

In the embodiments described hereinbefore, the magnetoresistant element 50 is placed above the second head gap 32. It would obviously not pass outside the scope of the invention to position it below the same. In the same way, the polarization conductor 80 could be located below instead of on the magnetoresistant element.

What is claimed is:

1. A magnetic reading head comprising:

a magnetic circuit having two pole pieces and a lower magnetic piece, said magnetic circuit having one gap constituting a first head gap located between said two pole pieces;

a magnetic field concentrator constituted by two magnetic layers in contact with said lower magnetic piece and being formed between said lower magnetic piece and said two pole pieces, said two magnetic layers separating said lower magnetic piece from said two pole pieces, said two magnetic layers being spaced from one another by a second head gap, and said two magnetic layers having a width which decreases on approaching the second head gap;

a longitudinal magnetoresistant element placed across said second head gap, said longitudinal magnetoresistant element being made from a multilayer material constituted by a stack of magnetic layers separated by nonmagnetic metal layers, said longitudinal magnetoresistant element being embedded in an insulated material.

2. The magnetic reading head according to claim 1, wherein the magnetoresistant element is bent on itself and is formed from a plurality of transverse portions and a plurality of parallel, longitudinal portions, arranged in a juxtaposed manner across the second head gap.

3. The magnetic reading head according to claim 2, wherein the transverse portions of the magnetoresistant element are short-circuited by a plurality of conductors.

4. The magnetic reading head according to claim 3, further comprising a polarization conductor to longitudinally polarize the magnetoresistant element.

5. The magnetic reading head according to claim 4, wherein a material of the polarization conductor is the same as a material of the plurality of conductors short-circuiting the transverse portions of the magnetoresistant element.

6. The magnetic reading head according to claim 1, wherein the magnetoresistant element has two ends connected by two conductive strips to two external elements.

7. The magnetic reading head according to claim 4, wherein the polarization conductor has two ends connected by two conductive strips to two external elements.

8. The magnetic reading head according to any one of the claims 2 to 7, further comprising a conductor coil surrounding a portion of the magnetic circuit, so that the magnetic head operates both in reading and writing.

9. The magnetic reading head according to claim 1, wherein the longitudinal magnetoresistant element is isolated from said pole pieces.

10. Process for producing said magnetic reading head according to claim 1, characterized in that it comprises the following operations:

on a substrate (20, $16_1$, $16_2$) is deposited a magnetic material layer, which is etched in order to form two layers ($30_1$, $30_2$) spaced from one another by a head gap (32), said layers having a width decreasing on approaching the head gap (32), on the two layers is deposited a first insulating layer (34), a metal layer is deposited and etched in order to form four internal conductor elements (41, 43, 45, 47) connected by four conductive strips (31, 33, 35, 37) to four external elements (21, 23, 25, 27), a multilayer magnetoresistant material layer is deposited and said layer magnetoresistant material is etched in order to form said magnetoresistant element, said element having two ends in contact with two first internal elements (41, 47), a second insulating layer (52) is deposited, said second insulating layer (52) is etched in order to free two other internal elements (43, 45), a conductive layer is deposited and etched to leave a ribbon (80) having two ends (73, 75) in contact with the two internal elements (43, 45), said ribbon (80) extending across the magnetoresistant element (50), on the two layers are formed two pole pieces ($90_1$, $90_2$) bearing on the two magnetic layers ($30_1$, $30_2$), said two pole pieces being-separated by a head gap (100).

11. Process according to claim 10, characterized in that a magnetoresistant element is produced in the form of parallel, longitudinal portions (a, b, c, d, e), arranged in juxtaposed manner across the head gap (32) separating the two magnetic layers ($30_1$, $30_2$) and transverse portions (A, B, C, D) connecting the ends of the longitudinal portions.

12. Process according to claim 11, characterized in that, in the operation of etching the second insulating layer (52), not only are the two other internal elements (43, 45) freed, but also the transverse portions (A, B, C, D) of the magnetoresistant element (50), so that in the operation of depositing the conductive layer, formation takes place of transverse conductors (81, 82, 83, 84) on the transverse portions (A, B, C, D) of the magnetoresistant element (50).

13. Process according to claim 10, characterized in that beforehand is formed a subassembly starting with a substrate (10), on which is formed a pole piece (14) with two pillars ($16_1$, $16_2$) and a conductor coil (18) embedded in an insulant (20), said subassembly serving as a substrate for the following operations, said process leading to a read and write head.

* * * * *